(12) United States Patent
Kingsbury et al.

(10) Patent No.: US 7,240,057 B2
(45) Date of Patent: Jul. 3, 2007

(54) SYSTEM AND METHOD FOR IMPLEMENTING JOURNALING IN A MULTI-NODE ENVIRONMENT

(76) Inventors: Brent A. Kingsbury, 20400 NW. Amberwood Dr., Suite 150, Beaverton, OR (US) 97006; Sam Revitch, 20400 NW. Amberwood Dr., Suite 150, Beaverton, OR (US) 97006; Terence M. Rokop, 20400 NW. Amberwood Dr., Suite 150, Beaverton, OR (US) 97006

( * ) Notice: Subject to any disclaimer, the term of this patent is extended or adjusted under 35 U.S.C. 154(b) by 515 days.

(21) Appl. No.: 10/251,894

(22) Filed: Sep. 20, 2002

(65) Prior Publication Data

US 2003/0065672 A1    Apr. 3, 2003

Related U.S. Application Data

(60) Provisional application No. 60/327,191, filed on Oct. 1, 2001, provisional application No. 60/324,787, filed on Sep. 24, 2001, provisional application No. 60/324,196, filed on Sep. 21, 2001, provisional application No. 60/324,226, filed on Sep. 21, 2001, provisional application No. 60/324,224, filed on Sep. 21, 2001, provisional application No. 60/324,242, filed on Sep. 21, 2001, provisional application No. 60/324,195, filed on Sep. 21, 2001, provisional application No. 60/324,243, filed on Sep. 21, 2001.

(51) Int. Cl.
    *G06F 17/30* (2006.01)
(52) U.S. Cl. .......................................................... 707/8
(58) Field of Classification Search .................... 707/1, 707/2, 5, 10, 200, 3, 8; 717/104; 714/4; 709/210
    See application file for complete search history.

(56) References Cited

U.S. PATENT DOCUMENTS

| | | | |
|---|---|---|---|
| 5,276,872 A | 1/1994 | Lomet et al. | 395/600 |
| 5,438,464 A | 8/1995 | Lewis et al. | 390/73.03 |
| 5,454,108 A * | 9/1995 | Devarakonda et al. | 718/104 |
| 5,678,026 A | 10/1997 | Vartti et al. | 395/479 |
| 5,751,992 A | 5/1998 | Bhargava et al. | 395/457 |
| 5,813,016 A | 9/1998 | Sumimoto | 707/201 |
| 5,850,507 A | 12/1998 | Ngai et al. | 707/202 |
| 5,909,540 A | 6/1999 | Carter et al. | 395/182.02 |
| 5,913,227 A | 6/1999 | Raz et al. | 711/152 |
| 5,920,872 A | 7/1999 | Grewell et al. | 707/202 |
| 5,953,719 A | 9/1999 | Kleewein et al. | 707/8 |
| 5,960,446 A | 9/1999 | Schmuck et al. | 707/205 |
| 5,987,506 A | 11/1999 | Carter et al. | 709/213 |
| 6,009,466 A | 12/1999 | Axberg et al. | 709/220 |
| 6,021,508 A | 2/2000 | Schmuck et al. | 714/4 |

(Continued)

OTHER PUBLICATIONS

Lomet, David; *Private Locking and Distributed Cache Management*; Proceedings of the Third International Conference on Parallel and Distributed Information Systems (PDIS 94), Austin, TX; Sep. 28-30, 1994.

*Primary Examiner*—Etienne P LeRoux

(57) ABSTRACT

A system and method are disclosed for providing journaling in a computer environment. An embodiment of the present invention comprises providing a first node and a second node; providing a journal wherein the journal is accessible by the first node and the second node; requesting a change in lock status by the first node; and executing a task by the second node in response to the request for the change in lock status by the first node.

10 Claims, 14 Drawing Sheets

U.S. PATENT DOCUMENTS

| | | | |
|---|---|---|---|
| 6,026,474 A | 2/2000 | Carter et al. | 711/202 |
| 6,044,367 A | 3/2000 | Wolff | 707/2 |
| 6,108,654 A | 8/2000 | Chan et al. | 707/8 |
| 6,154,512 A | 11/2000 | Homan | 375/376 |
| 6,163,855 A | 12/2000 | Shrivastava et al. | 714/4 |
| 6,178,519 B1 * | 1/2001 | Tucker | 714/4 |
| 6,226,717 B1 | 5/2001 | Reuter et al. | 711/147 |
| 6,256,740 B1 | 7/2001 | Muller et al. | 713/201 |
| 6,269,410 B1 | 7/2001 | Spasojevic | 710/5 |
| 6,272,491 B1 | 8/2001 | Chan et al. | 707/8 |
| 6,370,625 B1 | 4/2002 | Carmean et al. | 711/152 |
| 6,421,723 B1 | 7/2002 | Tawil | 709/224 |
| 2001/0042221 A1 | 11/2001 | Moulton et al. | 714/5 |
| 2002/0069340 A1 | 6/2002 | Tindal et al. | 711/203 |
| 2002/0091854 A1 | 7/2002 | Smith | 709/236 |
| 2002/0101946 A1 | 8/2002 | Hartman et al. | 375/376 |
| 2002/0150126 A1 | 10/2002 | Kovacevic | 370/503 |

* cited by examiner

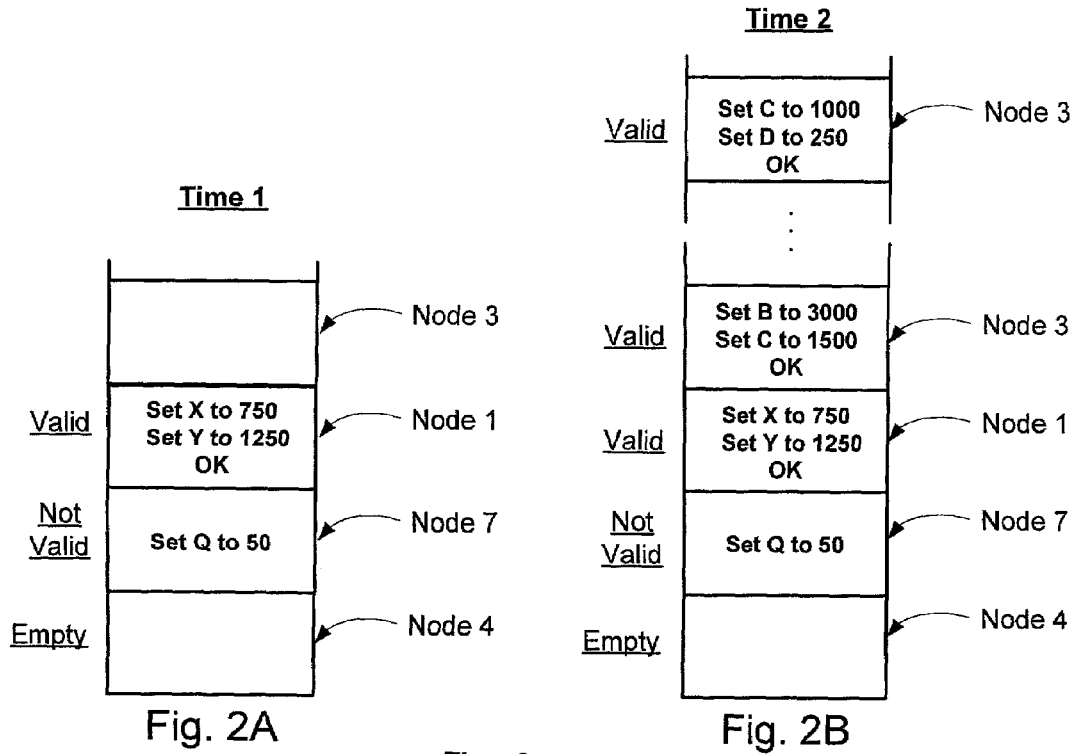
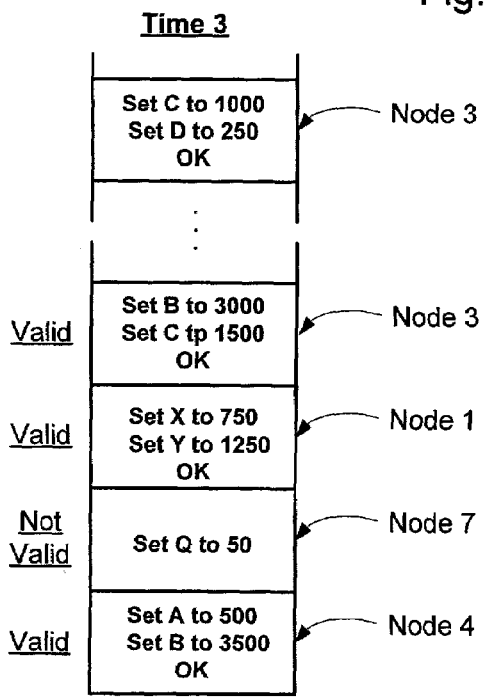

SYSTEM AND METHOD FOR IMPLEMENTING JOURNALING IN A MULTI-NODE ENVIRONMENT

CROSS REFERENCE TO RELATED APPLICATIONS

This application claims priority to U.S. Provisional Patent Application No. 60/324,196 entitled SHARED STORAGE LOCK: A NEW SOFTWARE SYNCHRONIZATION MECHANISM FOR ENFORCING MUTUAL EXCLUSION AMONG MULTIPLE NEGOTIATORS filed Sep. 21, 2001, which is incorporated herein by reference for all purposes.

This application claims priority to U.S. Provisional Patent Application No. 60/324,226 entitled JOURNALING MECHANISM WITH EFFICIENT, SELECTIVE RECOVERY FOR MULTI-NODE ENVIRONMENTS filed Sep. 21, 2001, which is incorporated herein by reference for all purposes.

This application claims priority to U.S. Provisional Patent Application No. 60/324,224 entitled COLLABORATIVE CACHING IN A MULTI-NODE FILESYSTEM filed Sep. 21, 2001, which is incorporated herein by reference for all purposes.

This application claims priority to U.S. Provisional Patent Application No 60/324,242 entitled DISTRIBUTED MANAGEMENT OF A STORAGE AREA NETWORK filed Sep. 21, 2001, which is incorporated herein by reference for all purposes.

This application claims priority to U.S. Provisional Patent Application No. 60/324,195 entitled METHOD FOR IMPLEMENTING JOURNALING AND DISTRIBUTED LOCK MANAGEMENT filed Sep. 21, 2001, which is incorporated herein by reference for all purposes.

This application claims priority to U.S. Provisional Patent Application No. 60/324,243 entitled MATRIX SERVER: A HIGHLY AVAILABLE MATRIX PROCESSING SYSTEM WITH COHERENT SHARED FILE STORAGE filed Sep. 21, 2001, which is incorporated herein by reference for all purposes.

This application claims priority to U.S. Provisional Patent Application No. 60/324,787 entitled A METHOD FOR EFFICIENT ON-LINE LOCK RECOVERY IN A HIGHLY AVAILABLE MATRIX PROCESSING SYSTEM filed Sep. 24, 2001, which is incorporated herein by reference for all purposes.

This application claims priority to U.S. Provisional Patent Application No. 60/327,191 entitled FAST LOCK RECOVERY: A METHOD FOR EFFICIENT ON-LINE LOCK RECOVERY IN A HIGHLY AVAILABLE MATRIX PROCESSING SYSTEM filed Oct. 1, 2001, which is incorporated herein by reference for all purposes.

This application is related to co-pending U.S. patent application Ser. No. 10/251,689 entitled A SYSTEM AND METHOD FOR SYNCHRONIZATION FOR ENFORCING MUTUAL EXCLUSION AMONG MULTIPLE NEGOTIATORS filed concurrently herewith, which is incorporated herein by reference for all purposes; and co-pending U.S. patent application Ser. No. 10/251,626 POLYP002) entitled SYSTEM ANT) METHOD FOR JOURNAL RECOVERY FOR MULTINODE ENVIRONMENTS filed concurrently herewith, which is incorporated herein by reference for all purposes; and co-pending U.S. patent application Ser. No. 10/251,690 entitled A SYSTEM AND METHOD FOR MANAGEMENT OF A STORAGE AREA NETWORK filed concurrently herewith, which is incorporated herein by reference for all purposes; and co-pending U.S. patent application Ser. No. 10/251,895 entitled A SYSTEM AND METHOD FOR A MULTI-NODE ENVIRONMENT WITH SHARED STORAGE filed concurrently herewith, which is incorporated herein by reference for all purposes; and co-pending U.S. patent application Ser. No. 10/251,893 entitled A SYSTEM AND METHOD FOR EFFICIENT LOCK RECOVERY filed concurrently herewith, which is incorporated herein by reference for all purposes.

FIELD OF THE INVENTION

The present invention relates generally to computer systems. In particular, the present invention relates to computer systems that share resources such as storage.

BACKGROUND OF THE INVENTION

Servers are typically used for big applications and workloads such as those used in conjunction with large web services and manufacturing. Often, a single server does not have enough power to perform the required application. To accommodate these large applications, several servers may be used in conjunction with several shared storage devices in a storage area network (SAN). In addition, it may be valuable to group servers together to achieve better availability or manageability.

As systems become large, it becomes more difficult to coordinate multiple component updates to shared data structures with high performance and efficient behavior. It would be beneficial to synthesize atomic updates on data structures spread over multiple data blocks when the hardware can only provide atomicity at the level of single block updates. The need for atomic update arises because systems can fail, and it can be costly or impossible to find and repair inconsistencies introduced by partially complete updates. One way to coordinate updates is through the use of a journal. The journal provides a mechanism to make updates atomic and durable.

What is needed is a system and method for managing a journal in a multi-node environment that can synthesize atomic updates to data structures spread over multiple data blocks. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which:

FIGS. 2A-2C are examples of journal entries according to an embodiment of the present invention.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying Figs. that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An embodiment of the present invention integrates the management of a journal with lock management used to control multi-node access to data.

Figure 1:
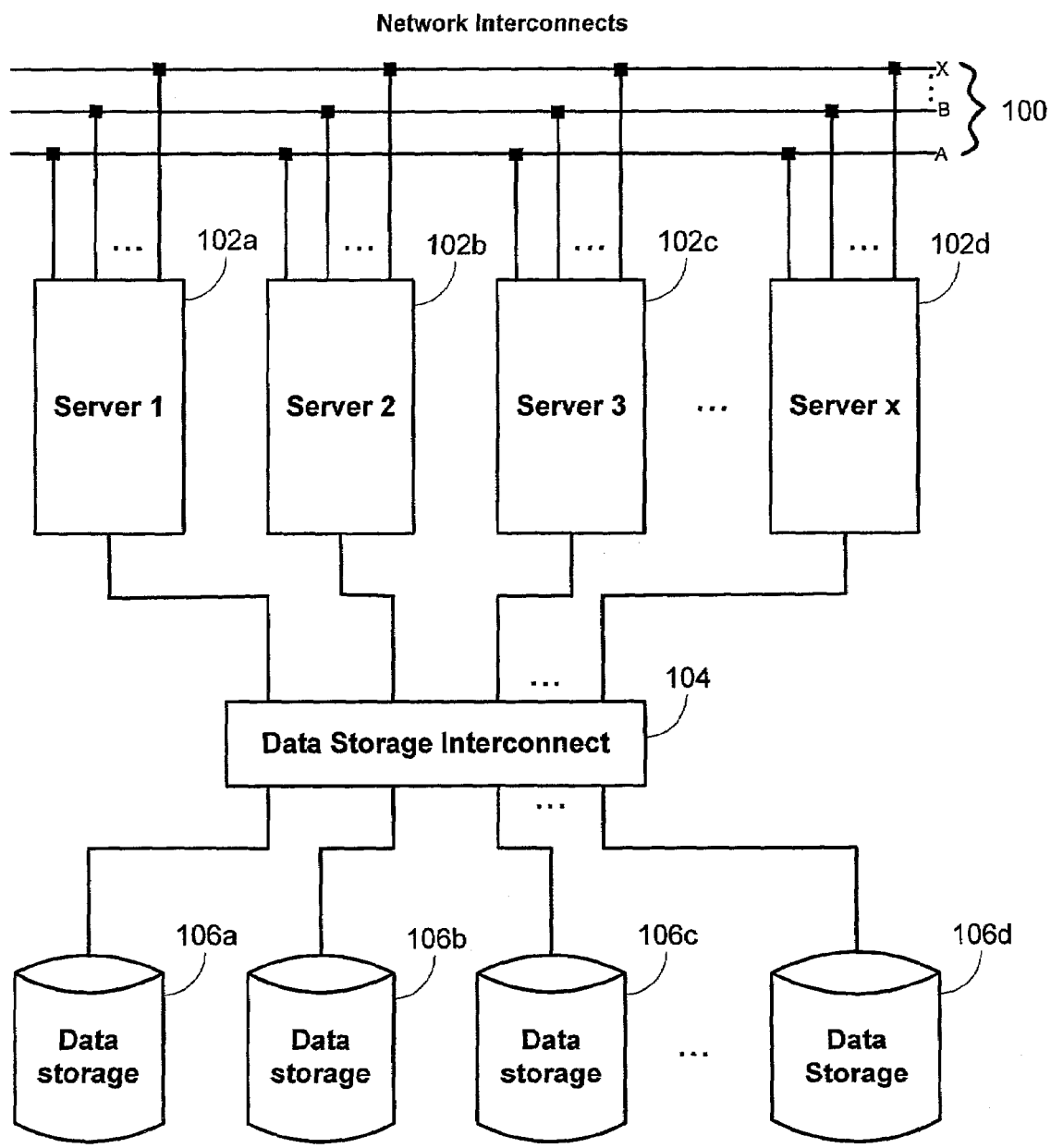
FIG. 1 is a block diagram of a shared storage system suitable for facilitating an embodiment of the present invention.

FIG. 1 is a block diagram of a shared storage system suitable for facilitating an embodiment of the present invention. In this example, nodes 102A-102D are coupled together through a network switch 100. The network switch 100 can represent any network infrastructure such as an Ethernet, InfiniBand network or Fibre Channel network capable of host-to-host communication. Additionally, the nodes 102A-102D are also shown to be coupled to a data storage interconnect 104. An example of the data storage interconnect 104 is a Fibre Channel switch, such as a Brocade 3200 Fibre Channel switch. Alternately, the data storage network might be an iSCSI or other IP storage network, InfiniBand network, or another kind of host-to-storage network. In addition, the network switch 100 and the data storage interconnect 104 may be embodied in a single interconnect. Examples of nodes 102A-102D include but are not limited to computers, servers, and any other processing units or applications that can share storage or data. For exemplary purposes, nodes 102A-102D will sometimes be referred to as servers. The data interconnect 104 is shown to be coupled to shared storage 106A-106D. Examples of shared storage 106A-106D include any form of storage such as hard drive disks, compact disks, tape, and random access memory.

Shared storage can be any storage device, such as hard drive disks, compact disks, tape, and random access memory. A filesystem is a logical entity built on the shared storage. Although the shared storage is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

FIGS. 2A-2C are examples of journal entries according to an embodiment of the present invention. A journaling mechanism is used to allow multiple independent processing nodes to update a common set of data structures atomically, even if these updates affect multiple blocks and the hardware is not capable of updating multiple blocks atomically. A journal records information about updates, possibly affecting multiple blocks, in a way that is easily located following a system failure. The act of creating a set of such updates that preferably occurs atomically is called a transaction. Each transaction is recorded in the journal with a journal entry. A journal entry includes a set of blocks written into the journal; these blocks include copies of the block values to be written as part of the update, along with information specifying the locations where these new values will be written. Sometimes these locations will be referred to as the final locations for the update, distinguished from the copies of the block values in the journal entry itself.

By writing a single block, atomically, to complete a journal entry, the journal seals the intention to perform a multi-block update in the shared storage. This is called making the journal entry valid. Until the journal entry is valid, no block values are updated in their final locations; once the journal entry is valid, block values can be updated in their final locations as desired. Accordingly, if there is a failure before a journal entry is made valid, the system can recover a state that includes no part of the updates in the recovered transaction corresponding to that journal entry; after the write completing a journal entry has been performed and the journal entry is valid, the state that includes all parts of that transaction's update can be recovered. In other words, none of the updates, even if they have been partially written into the journal entry, will be made if the node that is making the journal entry fails before the entry is made valid. After the entry is made valid, even if there is a failure, the valid updates will ultimately completed. Thus, by examining the journal after a failure, the data structures can be restored to a state that could have existed if all multi-block updates had been made atomically.

When all new values in a particular journal entry have been written to their final locations, the journal entry can be marked expired. An expired journal entry need not be retained, since all the updates it records have been performed; the space it takes up can be re-used for another purpose.

In the example shown in FIG. 2A, at time 1, node 3 retains information in its local memory, ready to update block B to 3,000 and block C to 1,500. In this simplified example, each blocks is assumed to store just an integer, and blocks are named by letters. For example, blocks B and C may represent two separate bank accounts wherein the user has transferred money from bank account B to bank account C. Node 3 has the information but has not yet recorded it in the journal.

Node 1 has set block X to 750, set block Y to 1250 and the journal entry recording this transaction has been made valid. Node 7 has set block Q to 50. Note that node 7 is in the middle of writing the transaction and the journal entry is not yet valid. Node 4 retains information in memory and wants to update block A to 500.

Between time 1 (FIG. 2A) and time 2 (FIG. 2B), node 4 wants to update block B as part of the same transaction updating block A to 500. Block B is part of a transaction from node 3 that is not yet valid (as shown in FIG. 2A). Accordingly, node 4 asks node 3 to make that transaction valid in order for node 4 to update block B. At time 2, shown in FIG. 2B, node 3 completed writing a journal entry recording the update that sets block B to 3000 and, block C to 1500, and the transaction is now valid. And in addition, node 3 has completed writing a journal entry for a prior transaction which set block C to 1000 and block D to 250. Node 7's journal entry is still not yet valid since it has not yet finished writing out its transaction. Node 4's journal entry remains empty.

Between time 2 (FIG. 2B) and time 3 (FIG. 2C), node 4 can write a journal entry for its transaction now that node 3 has finished its transaction with regard to block B. Note that valid journal entries do not have to be contiguous according to an embodiment of the present invention. At time 3, nodes 3, 1, and 4 have written valid transactions while node 7's transaction still remains not valid.

Figure 3A:
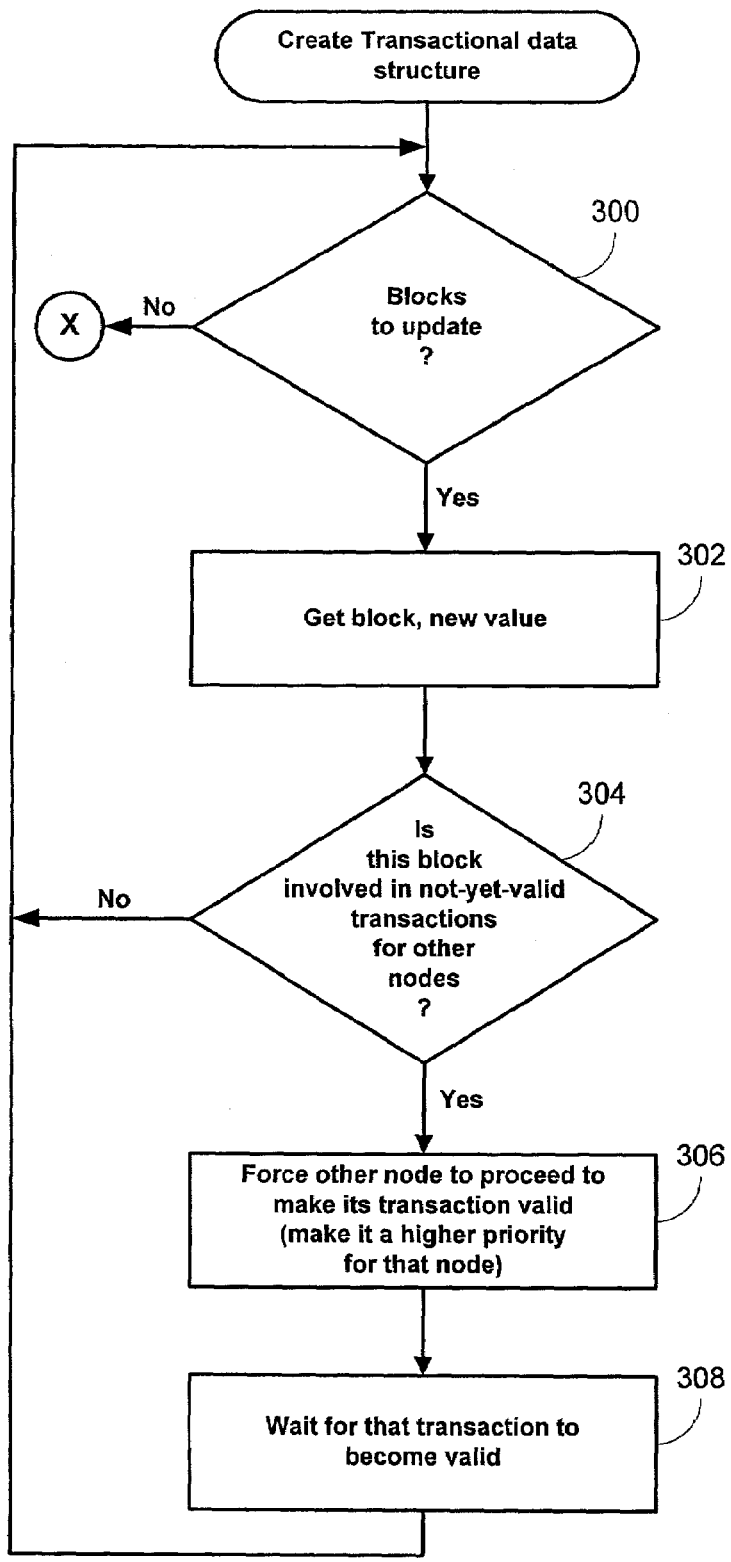
FIGS. 3A-3B are flow diagrams of examples of creating a transaction in a journal according to an embodiment of the present invention.
Figure 3B:
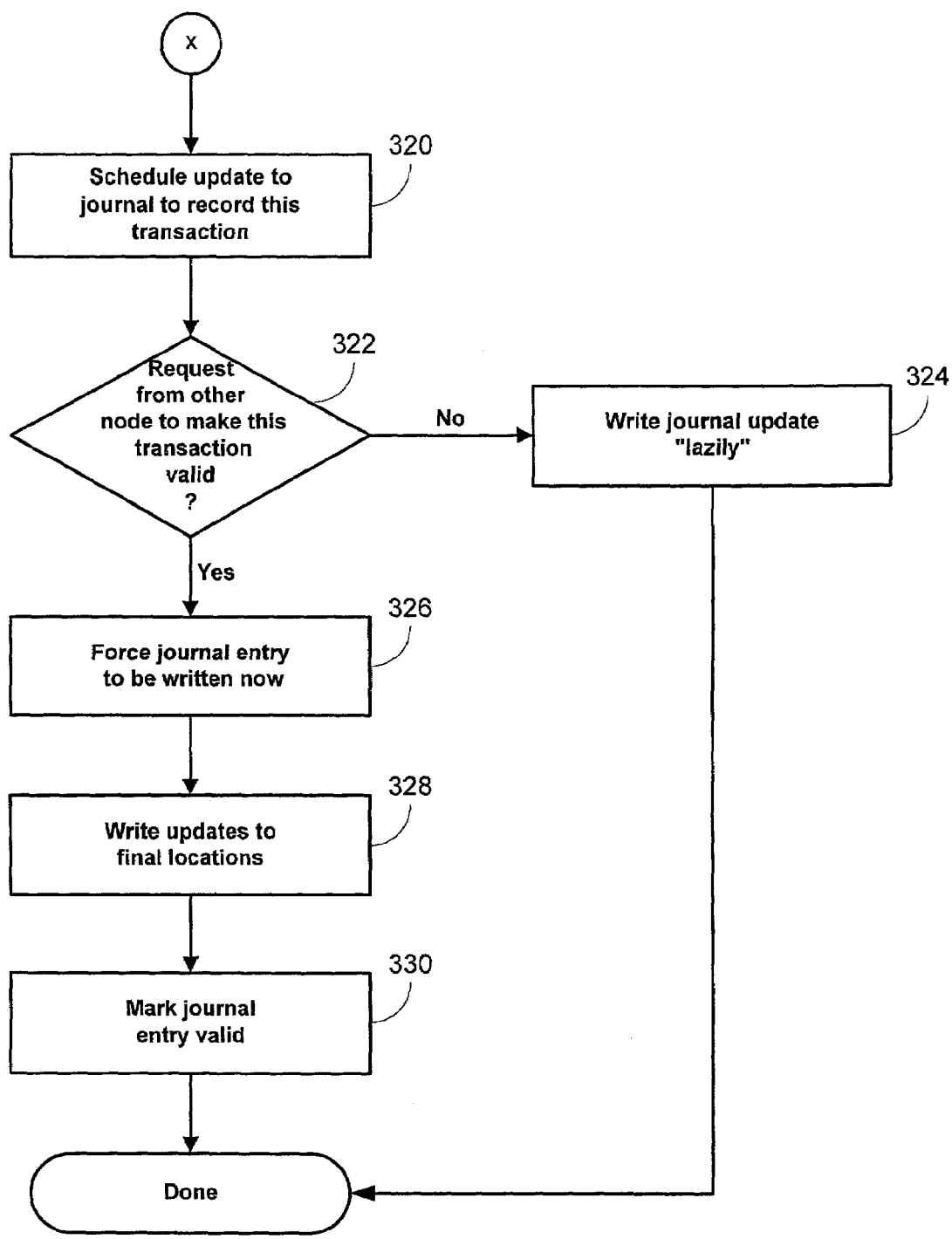

FIGS. 3A-3B are flow diagrams of examples of creating a transaction in a journal according to an embodiment of the present invention. In this example, in order to create a transactional data structure, a node determines whether there are blocks that need to be updated (300). If there are blocks that should be updated, then the block and the new value for the block are obtained (302). It is then determined whether this block is involved in a not-yet-valid transaction for another node(s) (304). Such an example was described in conjunction with FIG. 2 when node 4 needed to update block B but determined that node 3 was already planning to update B.

If this block is involved in a not-yet-valid transaction for another node, then force the other node to proceed to make its transaction valid (306). In the example given in FIG. 2, node 4 made node 3 proceed with its transaction, for example, my making the transaction a higher priority for node 3.

This node that is executing this method shown in FIGS. 3A-3B then waits for that transaction to become valid (308).

If this block is not involved in a not-yet-valid transaction for other nodes (304), then it is determined if there are more blocks to update. If there are no blocks to update (300), then the update to the journal is scheduled to record this transaction (320). It is then determined whether there is a request from another mode to make this transaction valid (322). If there is no request from another node, then this node can write the journal update "lazily" (324). In other words, the journal update has a low priority so that the journal is updated when it is convenient. An advantage to not writing the journal update immediately is to reduce the bottleneck at the journal during high transaction load among the nodes.

If there is a request from another node to make this transaction valid (322), then the journal entry is written immediately (326). For example, the journal entry will rise up in priority. Updates are then written to the final locations (328). The written journal entry is then marked valid (330).

FIGS. 2 and 3 illustrate how journaling can be used to allow multiple block updates to be performed atomically in a multi-node environment according to an embodiment of the present invention. FIGS. 4-8 describe how to use a locking mechanism efficiently to control when entries are written into the journal, to coordinate access to the journal from multiple nodes, and to share journaling data among the nodes according to an embodiment of the present invention.

Figure 4:
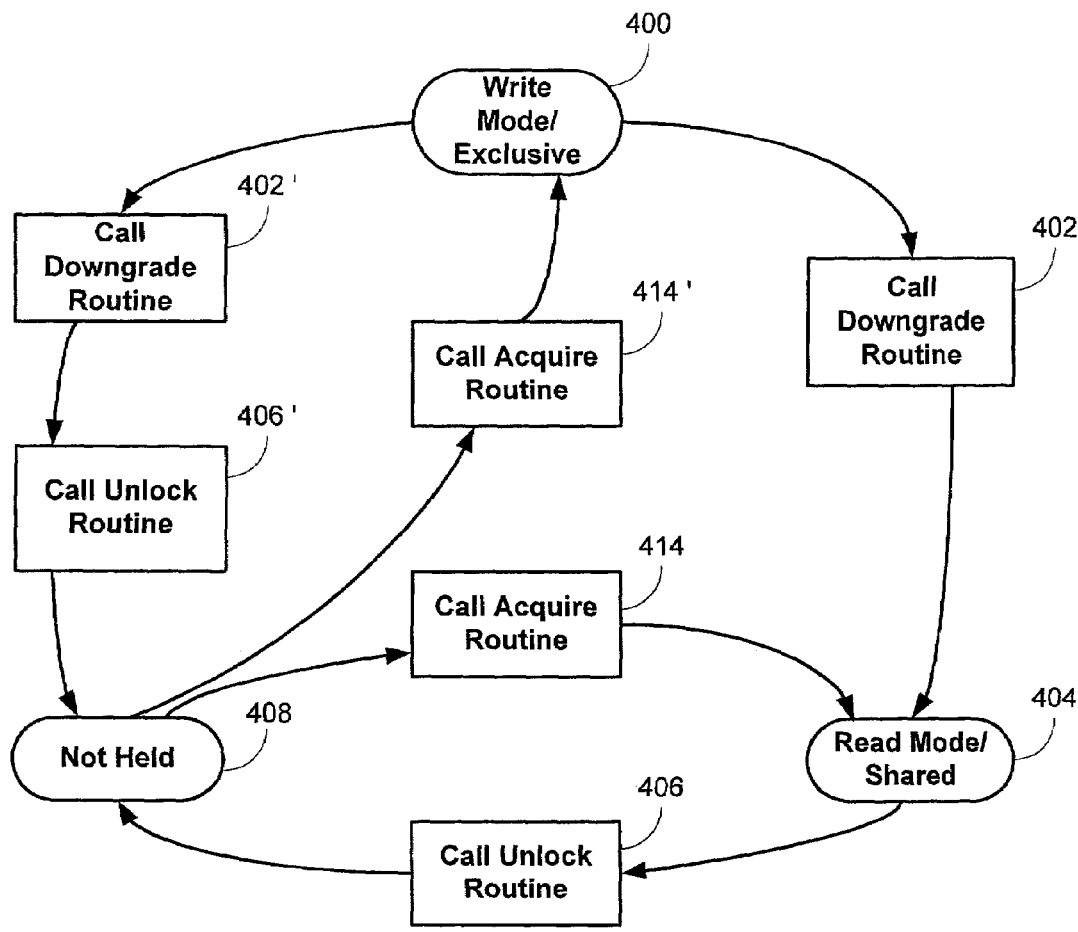
FIG. 4 is a state diagram of a method for lock and journal management according to an embodiment of the present invention.

FIG. 4 is a state diagram of a method for lock and journal management according to an embodiment of the present invention. In this example, three lock modes are shown: the exclusive mode (400), the shared mode (404), and the not held mode (408). For simplicity, the example shown in FIG. 4 only shows two modes other than the not held mode, the exclusive mode exemplified by a write mode 400, and the shared mode exemplified by the read mode (404). However, the present invention can accommodate a plurality of modes. These modes are modes in which nodes can obtain locks on a block so that the node can access data, such as reading a block or writing to a block. In this example, several nodes can read the same block while holding a lock in shared/read mode, while only one node may obtain a write/exclusive mode lock in order to write to a block.

In this example, when a node moves from having an exclusive lock 400 to a shared lock 404, then a downgrade routine 402 is called. When the node moves from holding a shared lock 404 to not holding a lock 408, then an unlock routine 406 is called. When the node moves from holding an exclusive lock 400 to not holding a lock 408, then the downgrade routine 402' is called as well as the unlock routine 406'.

When the node moves from not holding a lock 408 to holding a shared lock 404, then an acquire routine 414 is called. Likewise, when the node moves from not holding a lock to holding an exclusive lock 400, then the acquire routine 414' is called. For example, the acquire routine 414-414' could be used to complete the process of reading a block, as follows. When it is desired to read a block, a request is made for a read (shared) lock covering that block. At a later point, when the lock request is granted, the acquire routine is called. The acquire routine can then proceed to read the block. A similar process applies to write a block: a request for a write (exclusive) lock is made; the acquire routine is later called when the lock is granted, and the block can then be written.

An example of the unlock routine 406-406' is to maintain cache coherency. When a node has a block cached in memory, covered by a read or write lock, and another node wishes to update the block, the lock will be revoked on the first node. This will cause the unlock routine 406-406' to be called; this routine can remove the cached copy of the block from memory.

In the example shown in FIG. 4, the downgrade routine 402-402' can cause the node to write the updated block to the shared memory so that the lock that it holds is no longer exclusive. The unlock routine 406-406' can relinquish the lock from this node. The acquire routine 414-414' can acquire a lock at whatever level of exclusivity is needed.

Accordingly, in this embodiment of the present invention, changes in lock status can be used to communicate requests from one node to another to perform various tasks, as part of the downgrade/unlock/acquire routines.

Figure 5A:
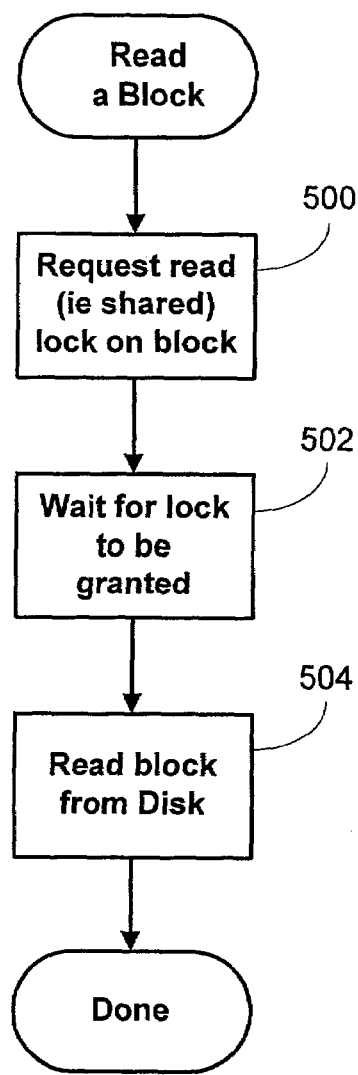
FIGS. 5A-5B show an example of a method of journaling in a multi-node environment according to an embodiment of the present invention.
Figure 5B:
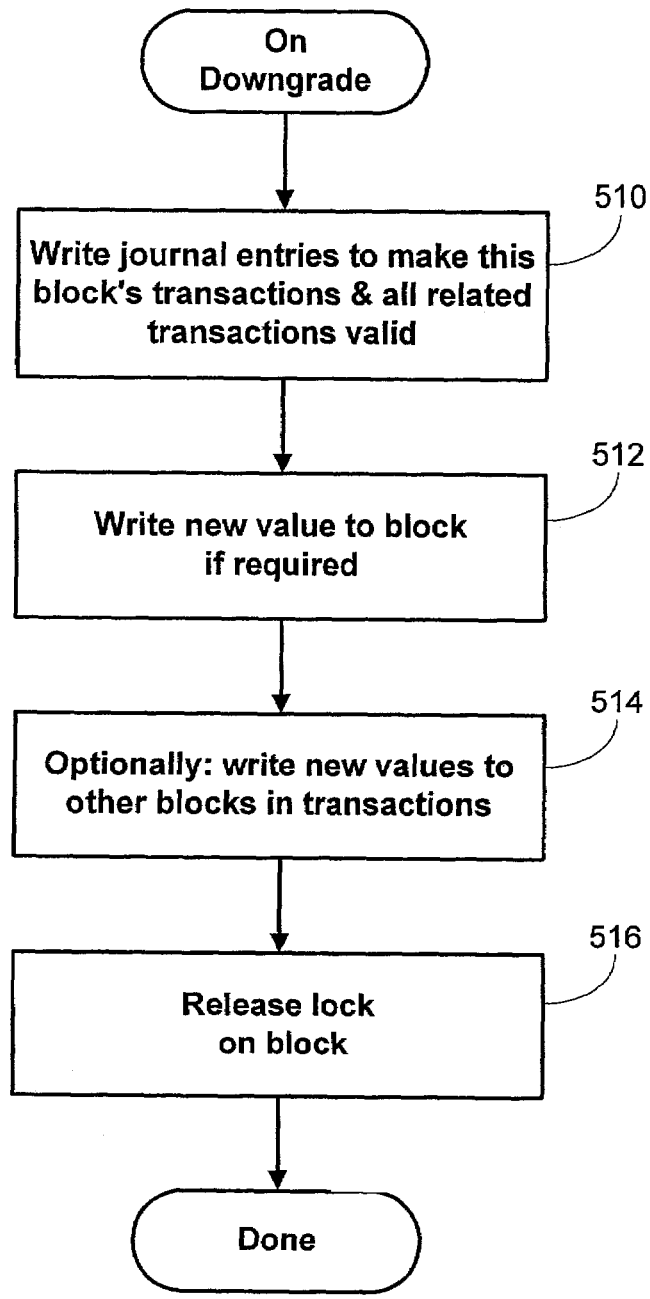

FIGS. 5A-5B show a method of journaling in a multi-node environment according to an embodiment of the present invention. This example shows an interaction between two nodes wherein node A requests a change in lock status which triggers a response in node B.

Node A attempts to acquire a lock in shared/read lock mode, in order to read a particular block. Node A requests a read lock on the block (500), waits for the lock to be granted to it (502), and reads the block from the disk (504). If Node A attempts to write a block, then it requests a write lock on the block rather than a read lock, waits for the lock to be granted, and reads the block from the disk.

When node A requests a read lock on the block (500 of FIG. 5A), the request initiates an side effect in node B. A side effect is used herein to indicate an intended action associated with some other event occurring—an event or task that is associated with the first event. In this example, the request by node A for a read lock initiates a downgrade routine in node B assuming that node B holds an exclusive-mode lock on the block requested by node A. Node B writes journal entries to make this block's transaction and all related transactions valid (510). Related transactions include those transactions, prior to the transaction which updates the block requested by A, which include updates to blocks that are also updated by the transaction. It is the transitive closure of the relation on the set of transactions in which transaction P is related to transaction Q if P was performed prior to Q and P and Q update at least one block in common. That is, it is required to follow the rule that no block appearing in a transaction which is valid can be involved in any prior transaction that is not yet valid. The "related transactions" are those transactions which must be made valid to stay consistent with this rule. For example, in FIG. 2, node 3's transaction to update blocks C and D is a related transaction.

Node B writes the new value to the block if required, if it has not already been written to disk (512). An example of when the new value would be necessary to write to the block is if node B held a write lock on the block and the block has been changed since the last time it was written to disk. The changed value would need to be written to the block so that the next node can access the updated version of the block. For instance, in FIG. 2B, Node 3 would write the value 3000 to block B, since Node 4 has made a request to access block B, if it had not already done so.

Node B would optionally write new values to other blocks on transaction (514). For example, in FIG. 2B, Node 3 could opt to write the value 1500 to block C at that point. Node B then releases the lock on the block (516).

Figure 6A:
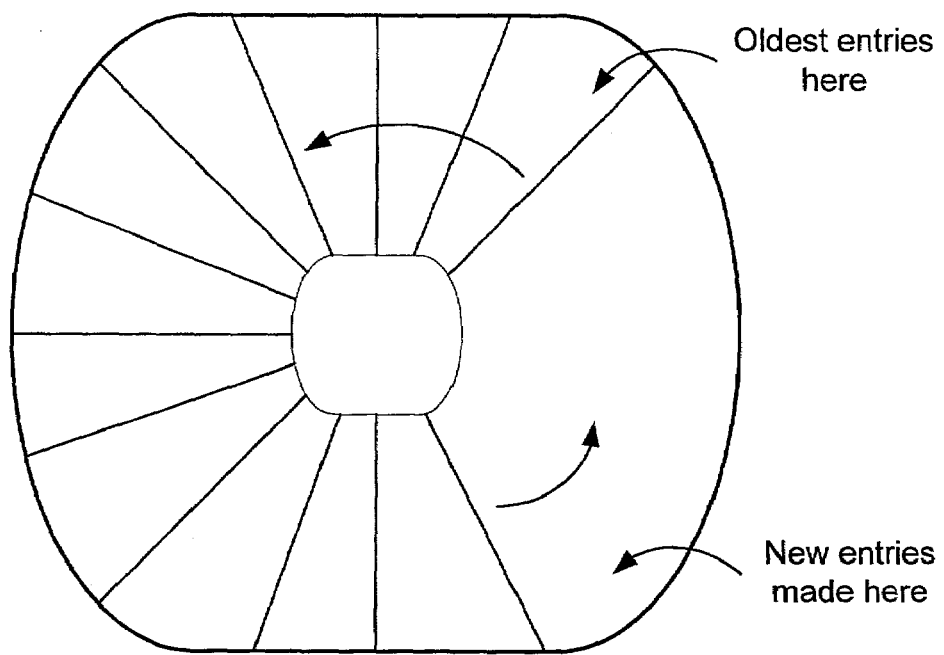
FIGS. 6A-6C show another example of a method of journaling in a multi-node environment according to an embodiment of the present invention.
Figure 6B:
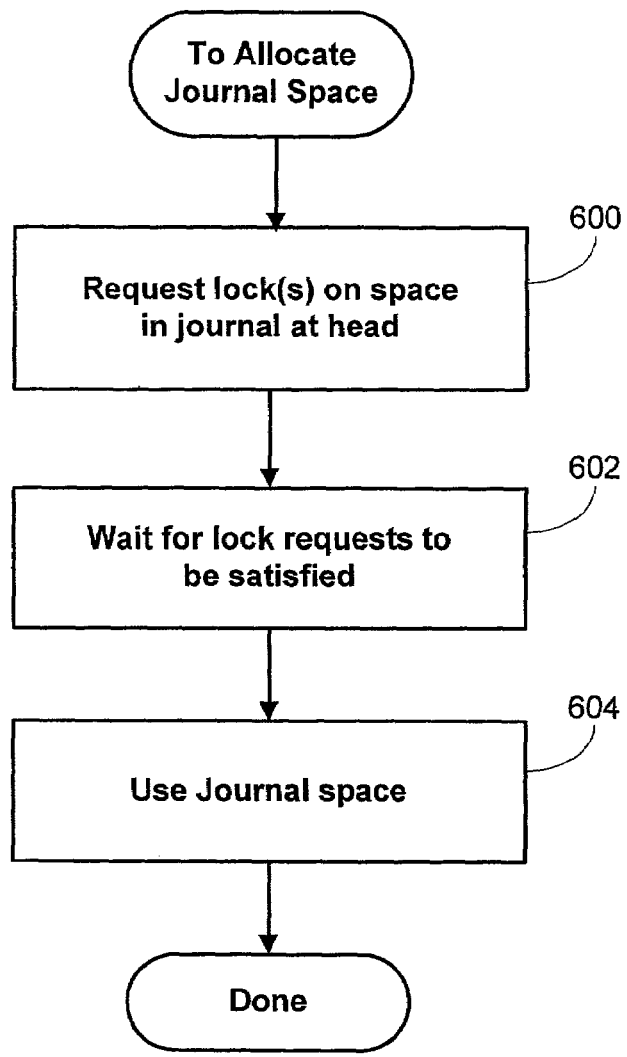
Figure 6C:
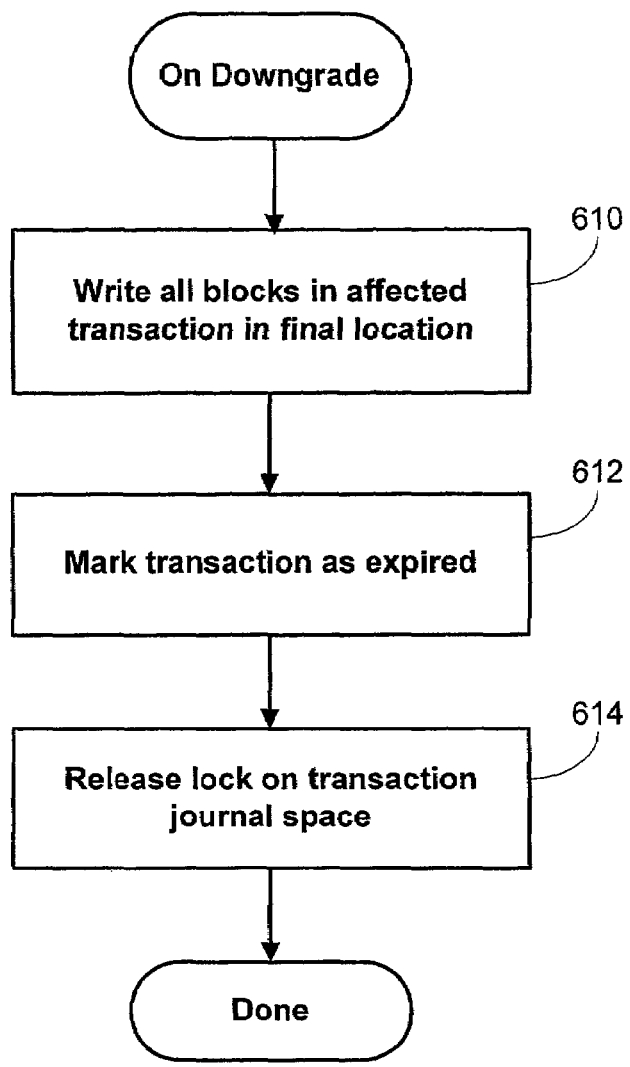

FIGS. 6A-6C show another example of a method of journaling in a multi-node environment according to an embodiment of the present invention. In this example, a change in lock state by node A initiates a side effect task on node B wherein a transaction expiration is triggered by journal space exhaustion.

FIG. 6A shows a journal structured circularly, where new entries are made growing in one direction while old entries are expired and deleted at a tail. When node A needs to write a new entry, it must allocate space at the head of the journal but if the head reaches the tail, no space will be available. At that time, it must ask one or more nodes to expire transactions at the tail of the log. This can be done through a downgrade routine.

In this example, node A requests a lock on space in the journal at the head of the journal (600 of FIG. 6B). It then waits for the lock request to be satisfied (602), and then uses the journal space (604). When node A requests the lock on space in the journal (600 of FIG. 6B), the request initiates a downgrade routine on node B, which is the node which wrote the journal entry at the tail and which is holding a lock or locks covering that part of the journal. Node B will ensure that all blocks in the journal entry at the tail have been written to their final locations (610 of FIG. 6C). The transaction is then marked as expired (612). The lock on the transaction's journal space is then released (614).

Figure 7A:
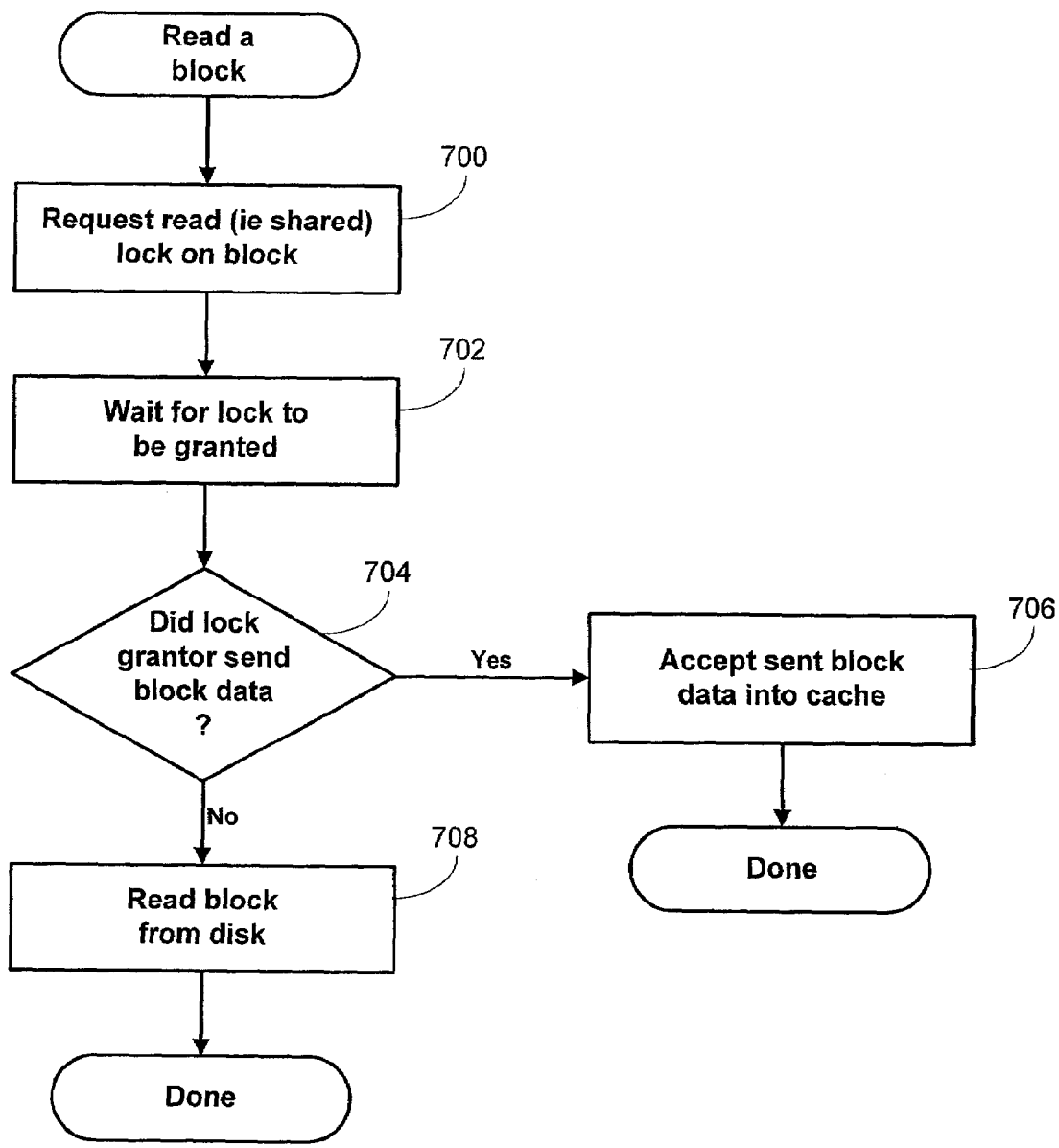
FIGS. 7A-7B show another example of a change in lock status by a first node driving tasks in a second node according to an embodiment of the present invention.
Figure 7B:
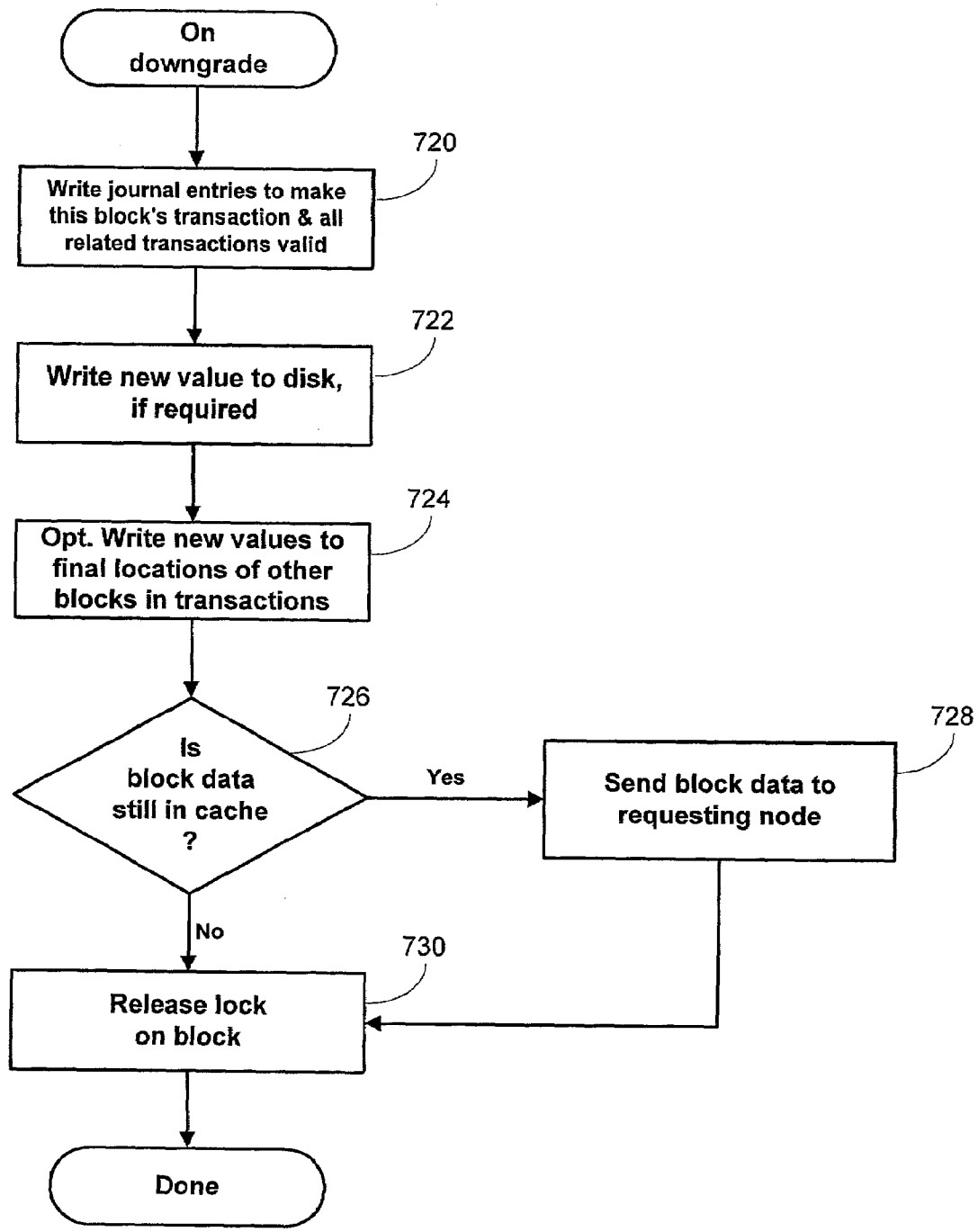

FIGS. 7A-7B show another example of a change in lock status by a first node driving tasks in a second node according to an embodiment of the present invention. In this example, nodes A and B use collaborative caching such as the system and method disclosed in "System and Method for Collaborative Caching in a Multinode Filesystem" filed Sep. 21, 2001, U.S. Ser. No. 60/324,224, which is herein incorporated by reference for all purposes.

In this example, node A attempts to read a block by requesting a read lock on the block (700). It waits for the lock to be granted (702), and determines whether the lock grantor has sent the requested block data (704). If the lock grantor has sent the data block, then node A accepts the sent block data into its cache (706). If, however, the lock grantor has not sent the block data (704), then node A reads the block from the shared disk (708).

The request by node A for a read lock on a block (700 of FIG. 7A) initiates a side effect by node B which has a lock on the requested block. In this example, the side effect is a downgrade. As in FIG. 5B, this downgrade causes node B to write journal entries to make this block's transaction and all related transactions valid (720). A new value is written to the shared disk if it is required (722). An example of when it would be required is if node B held a write lock on the block and has changed the data since the last write. It then optionally writes new values to other blocks in transaction (724). It is optional at this current time because once the journal entry is valid and complete, the values can be written to the final location whenever it is convenient for the node writing it.

It is then determined whether this block data still remains in node B's cache (726). If it is in the cache, then the block data is sent from node B to the requesting node A (728). Whether or not the requested block data is in cache (726), node B then releases the lock on the block (730).

Figure 8A:
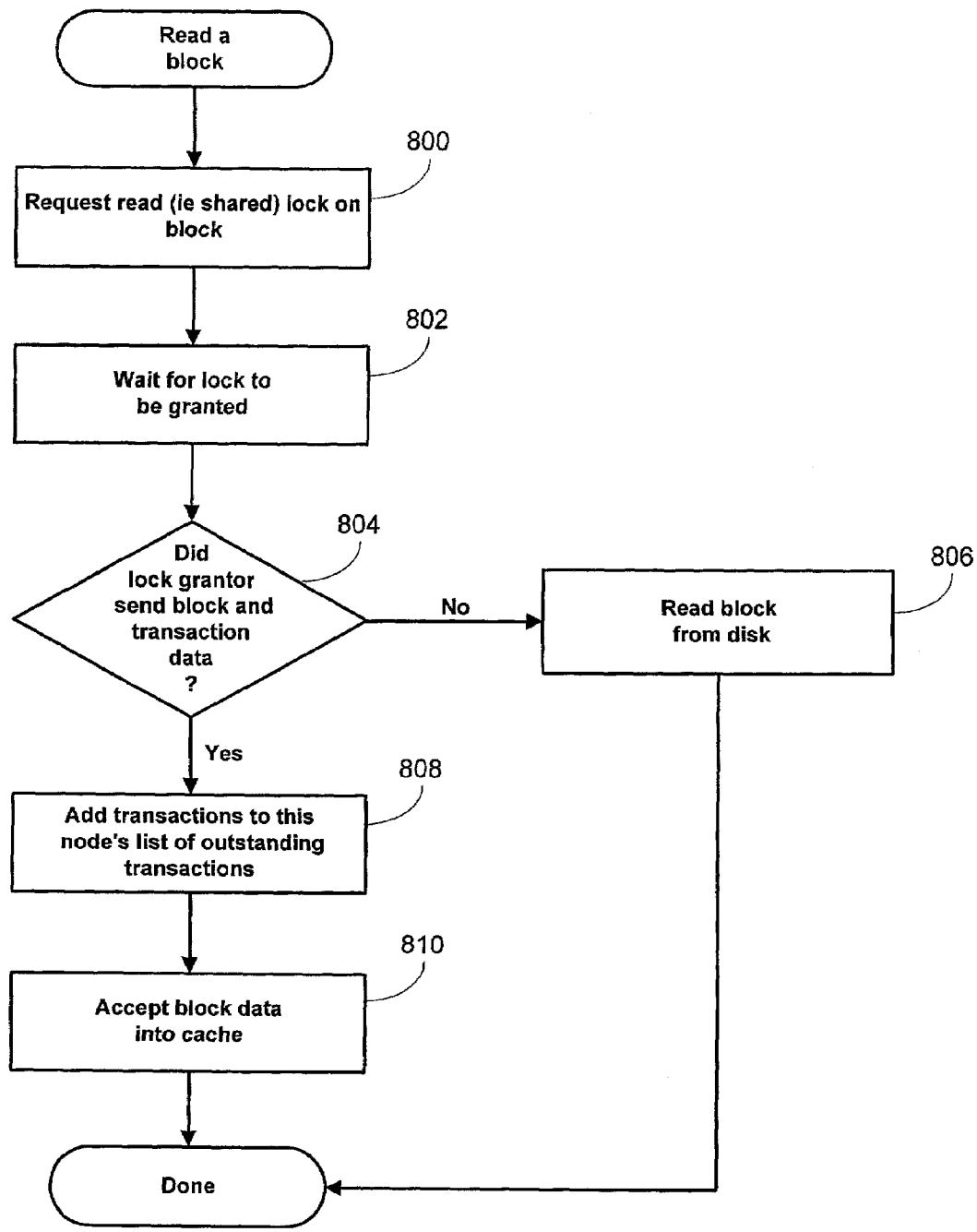
FIGS. 8A-8B show further examples of a change in lock status of a first node driving a task in a second node according to an embodiment of the present invention.
Figure 8B:
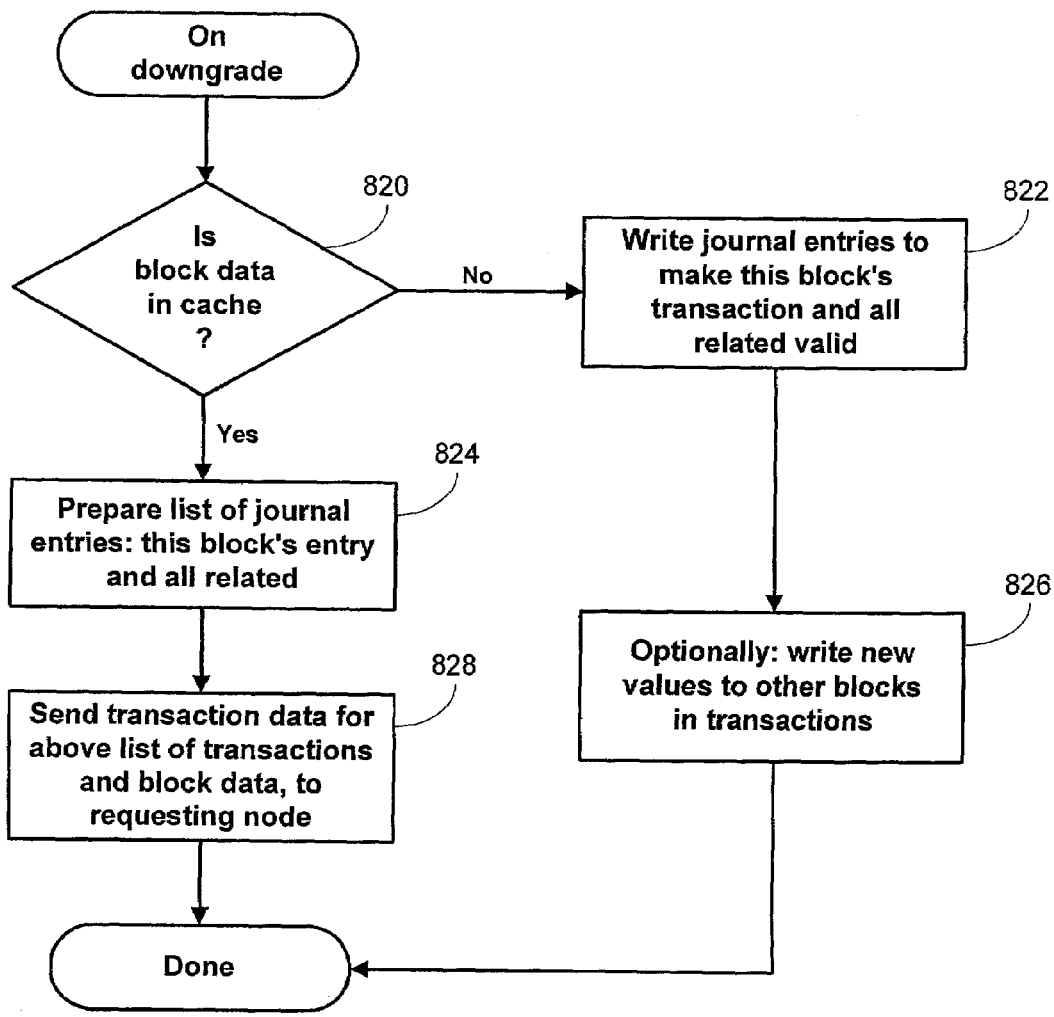

FIGS. 8A-8B show further examples of a change in lock status of a first node driving a task in a second node according to an embodiment of the present invention. In this example, nodes A and B are involved in transaction forwarding for collaborative caching.

Node A attempts to read a block by requesting a read lock on the block (800). It then waits for the lock to be granted (802), and determines whether the lock grantor sent the block and transaction data (804). If the lock grantor did not send the block and transaction data, then node A reads the block from the shared disk (806). If the lock grantor did send the block and transaction data (804), then the transactions are added to this node's (node A) list of outstanding transaction (808). Node A then accepts the block data into its cache (810).

When node A requests the read lock (800 of FIG. 8A), it initiates a downgrade routine for node B in which it is determined whether the requested block data is in node B's cache (820). If it is not in the cache, then node B writes the journal entries to make this block's transaction and all related transactions valid (822). Optionally, node B can also write new values to other blocks in transactions (826). This is as in FIG. 5B.

If the requested block data is in node B's cache (820), then node B prepares a list of journal entries of the transaction which modifies the requested block and all related transactions, as described above (824). This list of transactions is the same list which would be made valid in step 822. The contents of the journal entries for the above list of transaction and block data are then sent to the requesting node (828).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for journaling in a computer environment comprising:
   providing a journal wherein the journal is accessible by a first node and a second node, and the journal is configured to store changes, if any, to a data block configured to be shared by at least the first node and the second node;
   requesting a change in lock status with respect to a lock held or desired to be obtained by the first node; and
   executing a task by the second node in response to the request for the change in lock status by the first node;
   wherein the task is required to be completed in order for the change in lock status to be granted, the task is required to be completed before the first node receives a change, if any, by the second node to data of the data block, and the task is associated with an entry by the second node in the journal regarding the change by the second node to the data of the data block.

2. The method of claim 1, wherein the requesting the change in lock status is requesting a lock.

3. The method of claim 2, wherein the task is to write journal entries to make a transaction valid.

4. The method of claim 2, wherein the task is to write journal entries and send block data to the first node.

5. The method of claim 2, wherein the task is prepare a list of journal entries and send transaction data for the list to the first node.

6. The method of claim 1, wherein the requesting the change in lock status is requesting a lock on space in a journal.

7. The method of claim 6, wherein the task is to release the lock on a transaction journal space.

8. The method of claim 6, wherein the task is to write a block in a transaction to a disk and mark the transaction as expired.

9. A system for journaling in a computer environment comprising:
   a first node configured to request a change in lock status with respect to a lock held or desired to be obtained by the first node;
   a second node configured to execute a task in response to the request for the change in lock status by the first node; and
   a journal, wherein the journal is accessible by the first node and the second node, and the journal is configured to store changes, if any, to a data block configured to be shared by at least the first node and the second node;
   wherein the task is required to be completed in order for the change in lock status to be granted, the task is required to be completed before the first node receives a change, if any, by the second node to data of the data block, and the task is associated with an entry by the second node in the journal regarding the change by the second node to the data of the data block.

10. A computer program product for journaling in a computer environment, the computer program product being embodied in a computer readable medium and comprising computer instructions for:
    requesting a change in lock status with respect to a lock held or desired to be obtained by the first node;
    executing a task by the second node in response to the request for the change in lock status by the first node; and
    accessing a journal by the first node, wherein the journal is configured to store changes, if any, to a data block configured to be shared by at least the first node and the second node;
    wherein the task is required to be completed in order for the change in lock status to be granted, the task is required to be completed before the first node receives a change, if any, by the second node to data of the data block, and the task is associated with an entry by the second node in the journal regarding the change by the second node to the data of the data block.

* * * * *